US008694758B2

(12) United States Patent
Orenstien et al.

(10) Patent No.: US 8,694,758 B2
(45) Date of Patent: Apr. 8, 2014

(54) MIXING INSTRUCTIONS WITH DIFFERENT REGISTER SIZES

(75) Inventors: Doron Orenstien, Haifa (IL); Zeev Sperber, Zichron Yaakov (IL); Robert Valentine, Qirvat Tivon (IL); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1584 days.

(21) Appl. No.: 11/965,667

(22) Filed: Dec. 27, 2007

(65) Prior Publication Data
US 2009/0172363 A1 Jul. 2, 2009

(51) Int. Cl.
*G06F 9/34* (2006.01)
(52) U.S. Cl.
USPC .......................................... 712/229; 712/228
(58) Field of Classification Search
None
See application file for complete search history.

(56) References Cited

U.S. PATENT DOCUMENTS

| 4,779,232 | A | | 10/1988 | Fukunaka et al. | |
|---|---|---|---|---|---|
| 5,113,523 | A | * | 5/1992 | Colley et al. | 712/12 |
| 5,146,573 | A | | 9/1992 | Sato et al. | |
| 5,201,039 | A | * | 4/1993 | Sakamura | 711/201 |
| 5,790,826 | A | | 8/1998 | Thusoo et al. | |
| 6,209,082 | B1 | * | 3/2001 | Col et al. | 712/225 |
| 6,334,183 | B1 | | 12/2001 | Blomgren et al. | |
| 7,228,404 | B1 | * | 6/2007 | Patel et al. | 712/228 |
| 7,451,298 | B2 | * | 11/2008 | Peak et al. | 712/229 |
| 7,743,184 | B2 | | 6/2010 | Sibigtroth et al. | |
| 2005/0240870 | A1 | * | 10/2005 | Aldrich et al. | 715/700 |
| 2006/0101258 | A1 | * | 5/2006 | Jones et al. | 712/300 |
| 2009/0119321 | A1 | * | 5/2009 | Mitran | 707/101 |
| 2009/0204785 | A1 | * | 8/2009 | Yates et al. | 711/205 |

OTHER PUBLICATIONS

"i386 and x86-64 Options—Using the GNU Compiler Collection (GCC)", Feb. 1, 2001, from gcc.gnu.org.*

* cited by examiner

*Primary Examiner* — Andrew Caldwell
*Assistant Examiner* — William B Partridge
(74) *Attorney, Agent, or Firm* — Mnemoglyphics, LLC; Lawrence M. Mennemeier

(57) ABSTRACT

When legacy instructions, that can only operate on smaller registers, are mixed with new instructions in a processor with larger registers, special handling and architecture are used to prevent the legacy instructions from causing problems with the data in the upper portion of the registers, i.e., the portion that they cannot directly access. In some embodiments, the upper portion of the registers are saved to temporary storage while the legacy instructions are operating, and restored to the upper portion of the registers when the new instructions are operating. A special instruction may also be used to disable this save/restore operation if the new instruction are not going to use the upper part of the registers.

23 Claims, 6 Drawing Sheets

MIXING INSTRUCTIONS WITH DIFFERENT REGISTER SIZES

BACKGROUND

Computer systems are steadily becoming faster, more capable, and more complex. As processor technology advances, new instruction sets are developed that more efficiently execute the various tasks that are performed by these processors. In general, software is increasingly being used to perform graphics operations, streaming audio, streaming video, etc., in which it is efficient to simultaneously perform the same operation on several small sets of data in parallel. In particular, Single Instruction Multiple Data (SIMD) instructions may perform the same operation on several bytes (or nibbles, or words, etc.) that are located in the same register.

As the feature density of processors increases, allowing more circuitry to be placed in a single integrated circuit, the size of the registers that these instructions act upon may also increase. For example the size of the registers in processors has increased over the years from 8 bits, to 16 bits, to 32 bits, to 64 bits, to 128 bits, and now to 256 bits in some processors. New instruction sets have been created that use the full width of these larger registers, and new SIMD instructions may derive particular benefit from these larger registers.

An unfortunate side effect of this increase is that the installed base of legacy software applications using older instructions and smaller registers may sometimes not be compatible with software applications using the newer instructions and larger registers. For example, an instruction that is based on using 128-bit registers may save only half of the data in a 256-bit register, and therefore only those 128 bits will be restored to the register later. If the register had previously been completely filled with data by an instruction that assumed a 256-bit register, half of that data might be lost. This unexpected loss of data can have potentially catastrophic results. Trying to avoid the problem by replacing all the legacy software with new software would be prohibitively expensive in many applications.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1A:
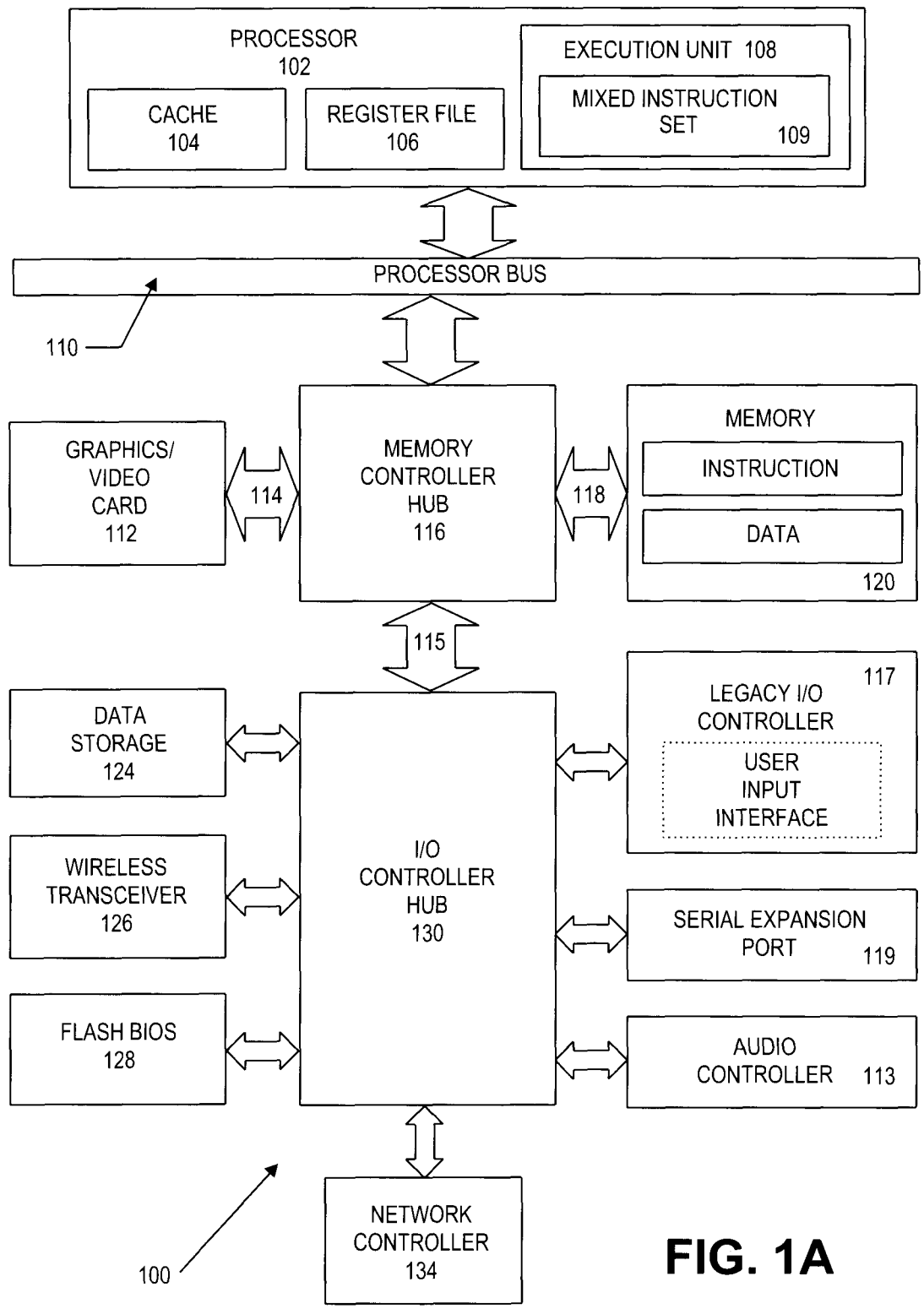
FIG. 1A, 1B, 1C show block diagrams of computer systems, according to some embodiments of the invention.

In the following description, numerous specific details such as processor types, micro-architectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Although the following embodiments are described with reference to a processor, other embodiments may be applicable to other types of integrated circuits and logic devices that involve instruction-based execution of various operations, use a mixture of new and legacy instructions. The teachings of the present invention may be applicable to any processor or machine that performs data manipulations using registers. Although two specific register sizes are used in the examples contained herein, these sizes are for example only. Other register sizes may also be used, and in some embodiments, more than two register sizes may be employed, using the same techniques described.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures, circuits, and operations have not been set forth in particular detail in order to not unnecessarily obscure the various embodiments of the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

Although the below examples describe instruction handling and distribution in the context of execution units and logic circuits, other embodiments of the present invention can be accomplished by way of software. In one embodiment, the methods of the present invention are embodied in machine-executable instructions. The instructions can be used to cause a general-purpose or special-purpose processor that is programmed with the instructions to perform the steps of the present invention. The present invention may be provided as a computer program product or software which may include a computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), including tangible media such as but not limited to: floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, etc. may A design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium, as previously described.

In modern processors, a number of different execution units are used to process and execute a variety of code and instructions. Not all instructions are created equal as some are quicker to complete while others can take a large number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task, which in turn can reduce the power consumption. These instructions can speed up software performance by operating on multiple data elements in parallel. An enhanced version of SSE instructions, which may be referred to herein as GSSE instructions, may also be used. These GSSE instructions can operate on larger size registers than SSE instructions. Some of these GSSE instructions may be otherwise identical to their corresponding SSE instructions, but other GSSE instructions may operate differently than any SSE instructions, and may in fact perform operations not performed by any SSE instruction. Some GSSE instructions may attempt to duplicate the actions of SSE instructions by storing/reading data only in the half of the register that would be directly affected by an SSE instruction.

The following describes embodiments of a technique to intermingle two different types of instructions, with each type designed to operate on a different size of registers, so that some of the data in the registers will not be unintentionally lost when that data is temporarily saved to another location.

FIG. 1A is a block diagram of a computer system 100 formed with a processor 102 that includes one or more execution units 108 execute various instructions. Some of these instructions may be designed to operate on registers of a particular width, while others of these instructions may be designed to operate on registers of a larger width. One embodiment may be described in the context of a single processor desktop or server system, but alternative embodiments can be included in a multiprocessor system. System 100 is an example of a hub architecture. The computer system 100 includes a processor 102 to process data. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data between the processor 102 and other components in the system 100.

The elements of system 100 perform their conventional functions that are well known to those familiar with the art.

In one embodiment, the processor 102 includes a Level 1 (L1) internal cache memory 104. Depending on the architecture, the processor 102 can have a single level internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a mixed instruction set 109, with the term 'mixed' indicating the instruction set includes some instructions that operate on registers of a smaller size, and also includes some instructions that operate on registers of a larger size. By including the mixed instruction set 109 in the instruction set of a general-purpose processor 102, along with associated circuitry to execute the instructions, the operations used by many applications may be performed using legacy software as well as new software in the same general-purpose processor 102. Thus, many applications can incorporate older, well-proven software without having to rewrite that software for the newer instructions sets.

Alternate embodiments of an execution unit 108 can also be used in micro controllers, embedded processors, graphics devices, DSPs, and other types of logic circuits. System 100 includes a memory 120. Memory 120 may be any feasible type of memory, such as but not limited to a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage. The MCH 116 is to direct data signals between the processor 102, memory 120, and other components in the system 100 and to bridge the data signals between processor bus 110, memory 120, and other components through I/O controller hub 130. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 may have a hub interface bus 115 to couple the MCH 116 to the I/O controller hub (ICH) 130. The ICH 130 may provide direct connections to some I/O devices via a local I/O bus. The local I/O bus may be a high-speed I/O bus for connecting peripherals to the memory 120, chipset 116, 130, and processor 102. Some examples are the audio controller, firmware hub (flash BIOS) 128, wireless transceiver 126, data storage 124, legacy I/O controller 117 containing user input and keyboard interfaces, a serial expansion port 119 such as Universal Serial Bus (USB), an audio controller 113, and a network controller 134. The data storage device 124 may comprise a hard disk drive, a floppy disk drive, a CD-ROM device, a flash memory device, or other mass storage device.

For another embodiment of a system, an execution unit to execute instructions designed for various register sizes can be used with a system on a chip. One embodiment of a system on a chip comprises a processor and a memory. The memory for one such system may be a flash memory. The flash memory can be located on the same die as the processor and other system components. Additionally, other logic blocks such as a memory controller or graphics controller can also be located on a system on a chip.

Figure 1B:
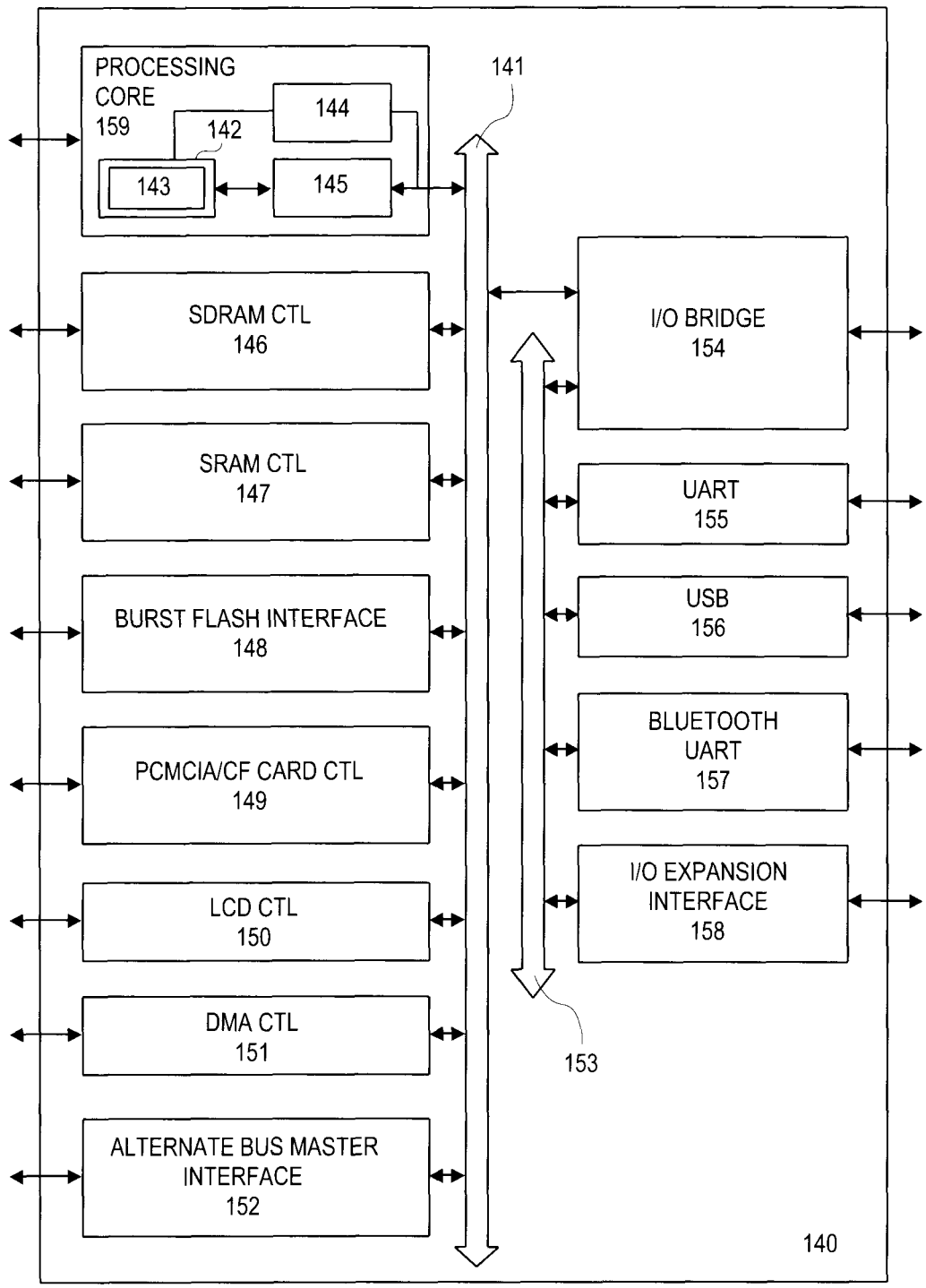

FIG. 1B illustrates a data processing system 140 which implements the principles of an embodiment of the present invention. It will be readily appreciated by one of skill in the art that the embodiments described herein can be used with alternative processing systems without departure from the scope of the invention.

Computer system 140 comprises a processing core 159 capable of performing SIMD operations using instructions designed for operating on registers of different sizes. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize and process instructions in instruction set 143 for performing operations on registers of different sizes. Execution unit 142 is coupled to register file 145 by an internal bus. Register file 145 represents a storage area on processing core 159 for storing information, including data, and many of these registers may be sized to accommodate those instructions that operate on the larger register sizes. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternate bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD and/or other operations. Processing core 159 may be programmed with various audio, video, imaging and communications algorithms including discrete transformations such as, for example, a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM). Some embodiments of the invention may also be applied to graphics applications, such as three dimensional ("3D") modeling, rendering, objects collision detection, 3D objects transformation and lighting, etc.

Figure 1C:
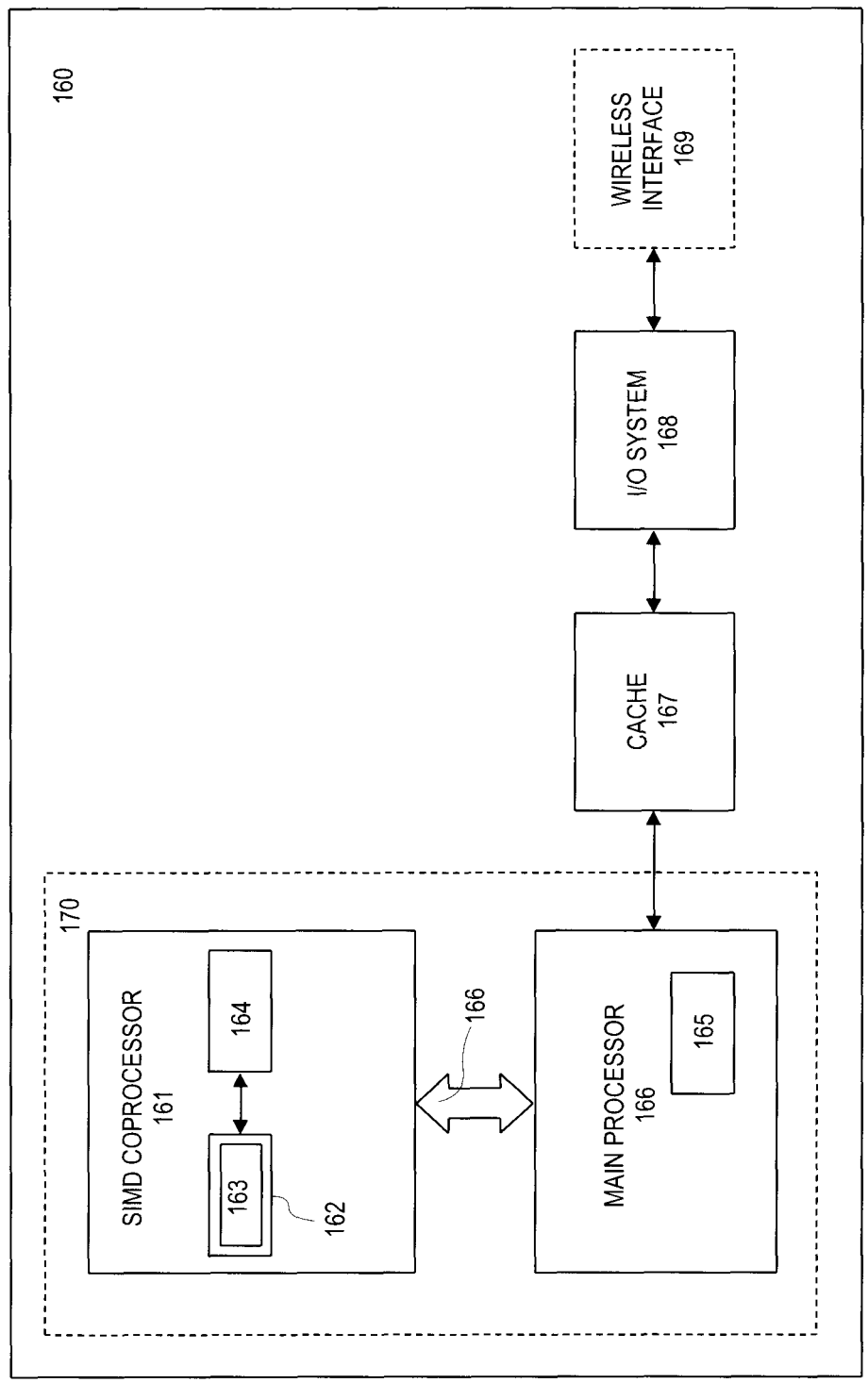

FIG. 1C illustrates alternative embodiments of a data processing system capable of handling mixed instruction sets. In accordance with one alternative embodiment, data processing system 160 may include a main processor 166, a SIMD coprocessor 161, a cache memory 167, and an input/output system 168. The input/output system 168 may optionally be coupled to a wireless interface 169. Processing core 170 may be suitable for manufacture in one or more process technologies, and by being represented on a machine readable media in sufficient detail may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 instructions that are capable of reading/writing to the entire contents of the registers n register file 164, and also including instructions that are capable of read/writing only to smaller size registers that were used in legacy systems. Processing core 170 also includes additional circuitry (not shown) which is not necessary to the understanding of embodiments of the present invention In operation, the main processor 166 may execute a stream of data processing instructions that control data processing operations of a general type including interactions with the cache memory 167, and the input/output system 168. Embedded within the stream of data processing instructions may be SIMD coprocessor instructions. The decoder 165 of main processor 166 recognizes these SIMD coprocessor instructions as being of a type that should be executed by an attached SIMD coprocessor 161. Accordingly, the main processor 166 may issue these SIMD coprocessor instructions (or control signals representing SIMD coprocessor instructions) on the coprocessor bus 166 from where they may be received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163. In some embodiments both main processor 166 and SIMD processor 161 may be able to execute instructions designed for older legacy register sizes and also instructions designed for newer (larger) register sizes. In other embodiments, only one of these two processors may be able to do so.

Figure 2:
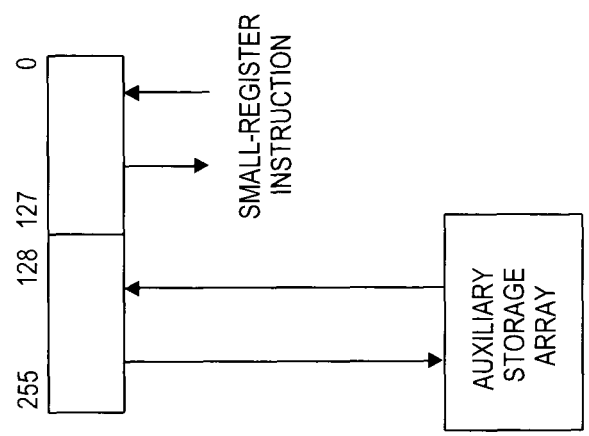
FIG. 2 shows a diagram of a register and an auxiliary storage array, according to an embodiment of the invention.
Figure 2:
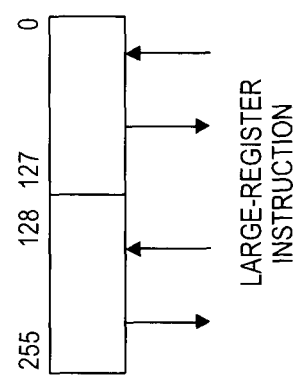

FIG. 2 shows a diagram of a register and an auxiliary storage array, according to an embodiment of the invention. Although a single register is shown, the same techniques may be applied to all the registers in a register file, either individually or as a group. The term "registers" is used here to refer to the storage locations that are used to temporarily hold operands for instructions executed by one or more processors. Although such registers are typically implemented by circuitry within the processor, some embodiments may implement these registers in main memory, in cache memory, or in other convenient locations. These operand registers may be used to hold any feasible type of data, such as but not limited to integer data, floating point data, packed data elements, etc.

The terms 'large-register instruction' and 'small-register instruction' are used to distinguish between instructions that are capable of operating on registers of different sizes. For example, a large-register instruction may be an instruction that is capable of operating on the full width of a 256-bit register, while a small-register instruction may be an instruction that is capable of operating on only 128-bits of that register. This distinction is intended to apply to classes of instructions that are designed for those register sizes. For example, a specific large-register instruction (i.e., a specific instruction from the large-register instruction class) might be programmed to write only to the lower 128 bits, but would still be considered a large-register instruction because it is capable of writing to the entire 256 bits if programmed to do so. By contrast, a specific small-register instruction (i.e., a specific instruction from the small-register instruction class) would not be capable of writing to more than 128 bits, and could not be programmed to write to more than 128 bits. This situation is likely to occur when a new processor with larger registers, and a new instruction set designed to operate on those larger registers, is created to improve data throughput. To preserve backwards compatibility with existing software, the older legacy instruction set may also be kept, but those legacy instructions would not be capable of operating on the full width of the larger registers.

Within the context of this document, the 'lower' portion of a register refers to the lower-numbered bit position (e.g., bits 0-127), while the 'upper' portion of a register refers to the higher-numbered bit positions (e.g., bits 128-255). Although specific register sizes are referenced in this document, these specific sizes are for example only, and should not be seen as a limitation on the embodiments of the invention. Other register sizes may also be used. Although the two specific register sizes described have a 2:1 ratio (256:128 bits), this should not be seen as a limitation on the embodiments of the invention. Other ratios may also be used (e.g., 512:128, etc.)

The operations described may typically be used when the software contains a mixture of large-register instructions and small-register instructions. A large-register instruction may place data in the full width of a large register, but subsequent small-register instructions may not be able to save and restore the full contents of that register. Further, some legacy software may call for the instruction to save/restore the data to a legacy small register. (Doubling the size of all registers in a new design might unreasonably increase the amount of real estate consumed on the die by those registers, and so some smaller registers may remain in the design).

Again referring to FIG. 2, when only large-register instructions are being used, these instructions are capable of handling the full width of the register, and may read or write to the register without problems. However, when a small-register instruction operates on the same register, it is only able to reliably read or write to the lower part of the register. It cannot reliably read or write to the upper part of the register, and in some cases may even have a destructive effect on the contents of the upper part. If only small-register instructions are used, the contents of the upper part are never used, so this defect may not matter. If only large-register instructions are used, the contents of the upper part are reliably handled, so again there may be no problem. But if a first large-register instruction writes original data to the register, then small-register instructions save and restore the contents of the register, and then a second large-register instruction tries to retrieve the original data, only the lower part of the register may contain the original data, while the contents of the upper part may have been lost through the operations of the small-register instructions. Although intervening small-register instructions may not always lose the upper part of the large register (some instructions might not even use the register), the possibility of this loss makes it reasonable to take action for all cases in which it might occur. For this situation, special features may be used to save the upper half of the register to another storage area, labeled in FIG. 2 as an auxiliary storage array.

In the illustrated example, the auxiliary storage array may only be large enough to hold the contents of a single register, and a similar auxiliary storage array may be used for each of the other registers that need to be handled in this manner. In other embodiments, a single array may be large enough to handle all the registers in a register file (e.g., if 16 bytes from each of 8 registers are to be saved in the array, an auxiliary array of 128 bytes may be used). Further, the array may or may not have the same width as the data being saved, although a wide array could permit the data to be saved more quickly by permitting multiple bytes to be saved in parallel. Although the term 'array' sometimes implies an X by Y matrix of storage locations, in some embodiments the array may be only one bit deep (e.g., a 128 by 1 bit array to save the upper 128 bits of a single register).

Various techniques may be used to determine when to use the auxiliary storage array and when it is not necessary. If it is not feasible to know whether this saving process will be needed (e.g., calling legacy software when the specific code being called is unknown), it may be assumed that this process will be needed, and the upper part of the register may be saved when there is a possibility it will be needed. Such a case may be handled by taking action when there is a transition from large-register instructions to small-register instructions.

In one such embodiment, whenever a large-register instruction is followed by a small-register instruction, the upper part of the register may be saved to the auxiliary storage array, in anticipation that preserving the contents of the upper part in this manner might be necessary. A flag may also be set to indicate that the array now has data preserved in it. After saving the upper part to the auxiliary storage array in this manner, when a small-register instruction is followed by a large-register instruction, the contents of the auxiliary storage array may be restored to the upper part of the register, and the flag reset to indicate the array no longer has data stored in it.

If there is no transition from one instruction type to the other (i.e., a string of only small-register instructions are executed, or a string of only large-register instructions are executed), then the flag may remain in its current state, and no data will be transferred between the register and the auxiliary storage array. The flag may be implemented in any feasible manner, such as but not limited to: 1) a hardware status bit, 2) a state in a state machine, 3) etc.

However, is some cases it is possible to know in advance that the upper part of the register will not need to be saved. If it is known at the time the software is developed that the upper part of the register won't contain useful data, then the logic for saving the upper part of the register may be disabled, and another flag may be set to indicate this. In such a case, a special instruction may be used to set the flag indicating that the upper part of the register will contain only zero's (or will be in some other 'don't care' state). In some embodiments, this instruction may actually write zero's to the upper part of the register, while in others the flag may be used to indicate that the upper part should be treated as containing all zeros, regardless of what it actually contains. The instruction is labeled here as ZEROUPPER, but this label should not be seen as a limitation on the embodiments of the invention. After ZEROUPPER is executed, subsequent small-register instructions may then execute without having to save/restore the upper part. This flag may remain set until it is reset by a subsequent event (e.g., reset by execution of the next large-register instruction).

Figure 3:
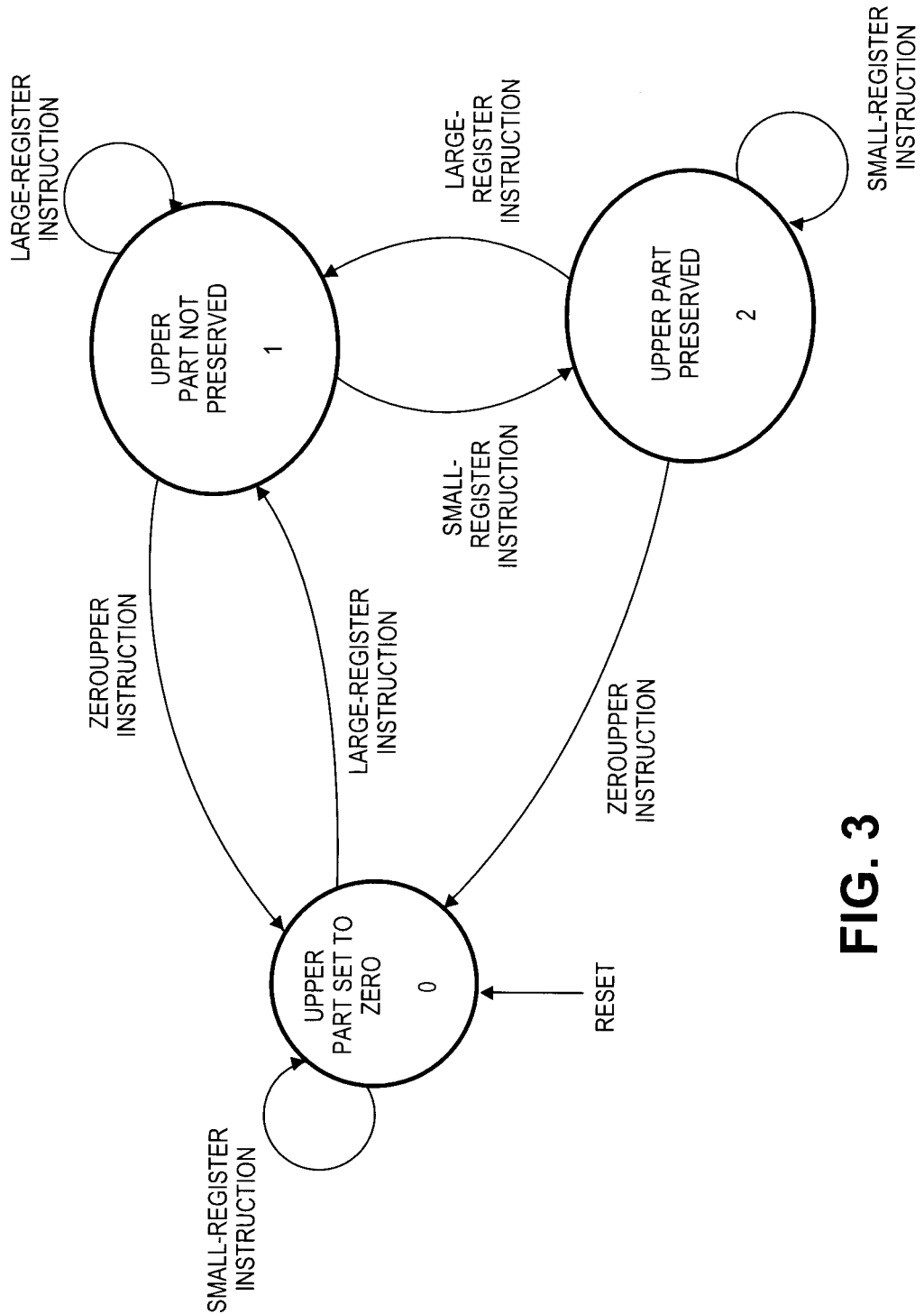
FIG. 3 shows a state diagram of a method of executing multiple instructions that use the same register, according to an embodiment of the invention.

FIG. 3 shows a state diagram of a method of executing multiple instructions that use the same register, according to an embodiment of the invention. This particular state diagram has 3 states (labeled 0, 1, and 2), and includes the ZEROUPPER instruction as well as the actions of saving/restoring data from the upper part of the register to the auxiliary array. In those embodiments that do not implement a ZEROUPPER instruction, state 0 may be removed from the diagram. This state diagram only shows the various states, and the transition between states. It does not show the actions that are triggered when a state change occurs. Those actions are described below, but are shown only in FIG. 4. A reset is shown to initially place the operation in state 0, but other embodiments may start elsewhere after a system reset. These operations may be implemented in various ways, such as a state machine, discrete logic, microcode, etc., or any combination of techniques.

Figure 4:
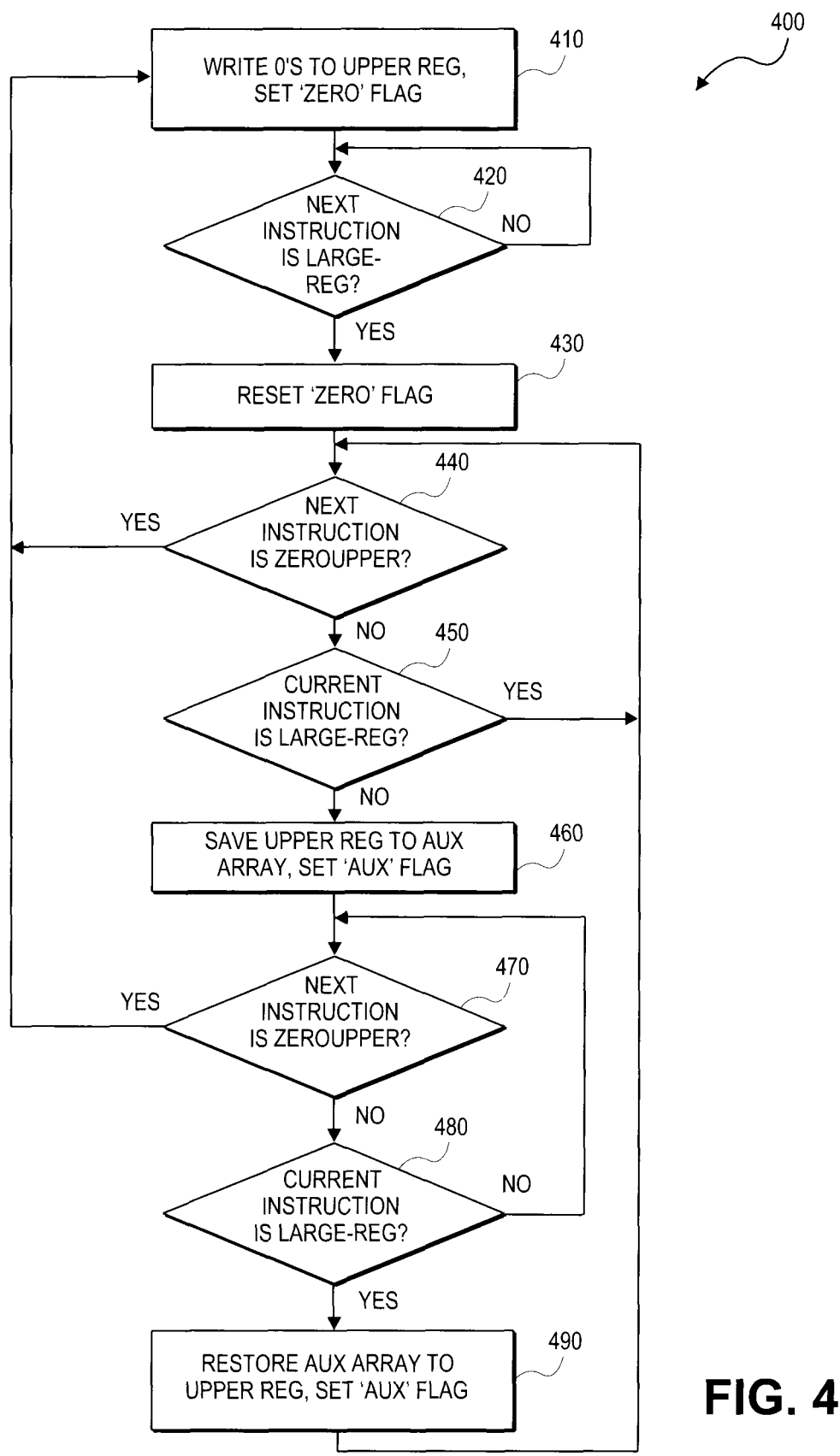
FIG. 4 shows a flow diagram of a method of executing multiple instructions that use the same register, according to an embodiment of the invention.

FIGS. 3 and 4 assume there are three distinct types of instructions that affect these operations: large-register instructions, small-register instructions, and the ZEROUPPER instruction. If there is an instruction that might be executed during these operations, and that instruction does not obviously fit into one of these types, it may be treated as one of these three types, or it may be ignored for the purposes of these operations, or it may be handled in other ways not comprehended here.

State 1 is the state that the system will be in when large-register instructions are operating, and it will remain there as long as only large-register instructions are executing. If in any other state, executing a large-register instruction will return to state 1. If a small-register instruction is encountered while in state 1, the upper part of the register will be saved to the auxiliary array, an 'auxiliary' flag will be set to indicate that data is saved in the auxiliary array, and the operation will enter state 2. The operation will remain in state 2 as long as only small-register instructions are executing. If a large-register instruction is encountered while in state 2, the data in the auxiliary array will be restored to the register, the auxiliary flag will be reset, and the operation will enter state 1.

If a ZEROUPPER instruction is executed while in state 1 or state 2, a 'zero' flag will be set, and the operation will enter state 0. In some embodiments, all zeroes will also be written into the upper part of the register, while in other embodiments, the zero flag will only serve to notify other operations that the upper contents of the register should be interpreted as all zeroes, regardless of what is contained there. Executing small-register instructions while in state 0 will cause no change. Although proper programming should prevent another ZEROUPPER instruction from being executed while in state 0, if this occurs it should not cause a problem, since this would just set a flag that is already set, and/or write zeroes to register locations that already contain zeroes. The operation may remain in state 0 until a large-register instruction is encountered, which will cause the zero flag to be reset, and the operation will go to state 1.

FIG. 4 shows a flow diagram of a method of executing multiple instructions that use the same register, according to an embodiment of the invention. In some embodiments, FIG. 4 describes the same operations as does FIG. 3, but from the perspective of a method rather than as a series of states. When comparing FIG. 4 to FIG. 3, block 420 may correspond closely to state 0, blocks 440-450 may correspond closely to state 1, and blocks 470-480 may correspond closely with state 2. Similar to the 'reset' entry point of FIG. 3, flow diagram 400 starts at 410 with placing the operation in a condition that executing a ZEROUPPER instruction would create. However, this is only an example, and does not imply that the operations must start from this point.

Beginning at that point, at 410 all zeroes may be written to the upper part of the respective register, and a flag may be set to indicate this has happened. This flag may serve as an indicator to other operations that the contents of the upper part of the register are not reliable data, and can be ignored. At 420, the next instruction to be executed is examined to determine if it is a large-register instruction. If not, it is a small-register instruction or a ZEROUPPER instruction, either of which will cause no change. The operation will loop at 420, looking at each new instruction in turn, until a large-register instruction is encountered.

When a large-register instruction is found, the zero flag will be reset at 430, and the operation will begin examining the subsequent instructions at 440-450. Note: the term 'next instruction' in these decision blocks implies that a new instruction is examined each time the block is entered, while the term 'current instruction' implies that the same instruction is being examined that was examined in the previous block. Hence, a different instruction (the next one to be executed) is being considered each time block 440 is entered, while block 450 examines the same instruction that was examined at 440.

If each new instruction examined at 440-450 is a large-register instruction, then no action is taken. However, if a ZEROUPPER instruction is encountered, then the operation will revert to 410. If a small-register instruction is encountered, then the operation will move to 460, where the upper part of the register is saved to the auxiliary array, and the auxiliary flag is set to indicate that this data is currently stored in the auxiliary array. Subsequent instructions are then examined at 470-480 to see if they are small-register instructions. As long as they are, no action is taken. However, if a ZEROUPPER instruction is encountered the operation will move to 410. If a large-register instruction is encountered, then at 490 the data in the auxiliary array is restored to the upper part of the register, and the auxiliary flag is reset to indicate there is no data being saved in the auxiliary array. Processing then moves to 440.

In most instances, the operations previously described usually cause some action to happen only when the next instruction to be executed is of a different type (i.e., large-register, small-register, or ZEROUPPER) than the previous instruction. This action, in turn, creates different conditions for the subsequent instructions. Since the instruction that triggers this change may require the changed conditions that its presence brings about (e.g., a large-register instruction may require the full contents of the register to be restored), these actions should take place before that instruction is executed, or at least before that instruction operates on the register.

The operations described herein may be implemented in any feasible manner, such as but not limited to: 1) discrete circuitry, 2) microcode, 3) a state machine, 4) firmware, 5) other techniques not described, 6) any combination of these.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:
a first register;
a storage element;
first logic coupled to the first register and the storage element, the first logic to store first data from an upper part of the first register into the storage element, responsive to detecting that a second instruction is executed next after a first instruction, wherein a lower part of the register is accessible to both the first and second instructions, and the upper part of the register is accessible to the first instruction but not to the second instruction; and
said first logic to disable said storing the first data from the upper part of the first register into the storage element responsive to executing a third instruction.

2. The apparatus of claim 1, further comprising second logic coupled to the first register and the storage element, the second logic to store the first data from the storage element into the upper part of the register, responsive to detecting that a fourth instruction is executed next after a third instruction, wherein a lower part of the register is accessible to both the third and fourth instructions, and the upper part of the register is accessible to the fourth instruction but not to the third instruction.

3. The apparatus of claim 2, further comprising an indicator to indicate if the first data is stored in the storage element, wherein the second logic is activated only if the indicator indicates the first data is stored in the storage element.

4. The apparatus of claim 3, further comprising a second register coupled to the storage element, wherein the first logic is to store second data from an upper part of the second register into the storage element responsive to detecting that the second instruction is executed next after the first instruction.

5. The apparatus of claim 4, wherein the second logic is to store the second data of the storage element in the upper part of the second register.

6. An apparatus, comprising:
a register; and
a first instruction to set an indicator to indicate that contents of an upper part of the register are to be ignored by subsequent instructions capable of operating on only a lower part of the register while the indicator is set without saving or restoring the upper part of the register.

7. The apparatus of claim 6, wherein the first instruction is further to write a predetermined bit pattern in the upper part of the register.

8. The apparatus of claim 6, further comprising:
a second instruction to reset the indicator to indicate that the contents of the upper part of the register are to be preserved in a storage element under particular conditions;
wherein a width of the register is equal to a maximum operand size of the second instruction.

9. A system, comprising:
a register;
a memory to store instructions from a first instruction set for operating on a full width of the register and to store instructions from a second instruction set capable of operating only on less than the full width of the register;
a storage array coupled to the register;
first logic to make a first determination if an instruction of the second instruction set is to be executed next on the register after an instruction of the first instruction set has been executed;
second logic, activated by said first determination, to read a portion of data from an upper part of the register less than the full width of the register and to store this portion into the storage array; and
said second logic deactivated responsive to an indicator being set, by execution of a first instruction, to indicate that the upper part of the register is to be ignored by subsequent instruction of the second instruction set while the indicator is set without reading and storing the portion of data from the upper part of the register.

10. The system of claim 9, further comprising:
third logic to make a second determination if an instruction of the first instruction set is to be executed next after an instruction of the second instruction set; and
fourth logic, activated by said second determination, to read the data in the storage array and store the data in the upper part of the register.

11. The system of claim 9, further comprising a particular instruction to disable the second and fourth logic.

12. The system of claim 9, further comprising a register file containing multiple registers;
wherein the storage array is to store the contents of the upper part of every register in the register file.

13. The system of claim 9, wherein instructions of the second instruction set are capable of operating only on a lower part of the register.

14. The system of claim 9, further comprising a particular instruction to disable the second logic.

15. A method, comprising:
executing a first instruction capable of operating on all bits of a register;
detecting an intended execution of a second instruction capable of operating on only a lower part of the register, the second instruction being a next instruction to execute on the register after the first instruction has been executed;
storing, resultant to said detecting the intended execution of the second instruction, contents of an upper part, less than all bits, of the register into a storage; and
disabling said storing of the contents of the upper part of the register into the storage responsive to an indicator being set, by execution of an instruction other than the second instruction, to indicate that the upper part of the register is to be ignored by subsequent instructions capable of operating on only the lower part of the register while the indicator is set.

16. The method of claim 15, further comprising:
executing a third instruction capable of operating on only the lower part of the register;
detecting an intended execution of a fourth instruction capable of operating on all the bits of the register; and
storing, resultant to said detecting the intended execution of the fourth instruction, contents of the storage into the upper part of the register.

17. A method, comprising:
executing a first instruction capable of modifying all architecturally visible bits of any one of the registers of a register file;
detecting an intended execution of a second instruction capable of operating on only a lower part, less than all architecturally visible bits, of a register of the register file, the second instruction being a next instruction to execute on the register after executing the first instruction;

storing, in response to said detecting the intended execution of the second instruction, contents of an upper part, less than all architecturally visible bits, of the register into a storage; and executing a third instruction to disable said storing the contents of the upper part of the register into the storage.

18. The method of claim 17, wherein said executing the third instruction comprises writing a content of all zeros into the upper half of the register.

19. An article comprising a tangible computer-readable non-transient medium that contains instructions, which when executed by at least one processor results in performing operations comprising:

executing a first instruction capable of operating on all bits in a register;

executing a second instruction capable of operating on only a lower part, less than all bits of the register;

storing an upper part, less than all bits, of the register in a temporary storage array, resultant to executing the second instruction next on the register after executing the first instruction; and disabling said storing of the contents of the upper part of the register into the storage responsive to an indicator being set, by execution of another instruction before executing the second instruction, to indicate that the upper part of the register is to be ignored by subsequent instructions capable of operating on only the lower part of the register while the indicator is set.

20. The article of claim 19, wherein the operations further comprise:

executing a third instruction capable of operating on only the lower part of the register;

executing a fourth instruction capable of operating on all the bits in the register; and storing contents of the storage array into the upper part of the register, resultant to executing the fourth instruction next after executing the third instruction.

21. The article of claim 19, wherein the operations further comprise executing a third instruction to disable said storing the upper part of the register.

22. The article of claim 21, wherein the operation of executing the third instruction further comprises writing a content of all zeros into the upper part of the register.

23. The article of claim 21, wherein the operations further comprise:

executing, subsequent to executing the third instruction, a fourth instruction capable of operating on all the bits in the register; and re-enabling said storing the upper part of the register, resultant to said executing the fourth instruction.

* * * * *